United States Patent
Knaup

(10) Patent No.: US 11,366,464 B2
(45) Date of Patent: Jun. 21, 2022

(54) DIAGNOSIS UNIT, SYSTEM AND METHOD THAT UTILIZES ACTUATOR CYLINDER PRESSURE

(71) Applicant: Fibro GmbH, Hassmersheim (DE)

(72) Inventor: Markus Knaup, Auenwald (DE)

(73) Assignee: Fibro GmbH, Hassmersheim (DE)

( * ) Notice: Subject to any disclaimer, the term of this patent is extended or adjusted under 35 U.S.C. 154(b) by 0 days.

(21) Appl. No.: 16/970,365

(22) PCT Filed: Feb. 22, 2019

(86) PCT No.: PCT/EP2019/054431
§ 371 (c)(1),
(2) Date: Aug. 16, 2020

(87) PCT Pub. No.: WO2019/206495
PCT Pub. Date: Oct. 31, 2019

(65) Prior Publication Data
US 2021/0089017 A1    Mar. 25, 2021

(30) Foreign Application Priority Data
Apr. 26, 2018   (DE) .................... 10 2018 110 084.1

(51) Int. Cl.
*G05B 23/02* (2006.01)
*G07C 3/00* (2006.01)

(52) U.S. Cl.
CPC ........... *G05B 23/0267* (2013.01); *G07C 3/00* (2013.01)

(58) Field of Classification Search
None
See application file for complete search history.

(56) References Cited

U.S. PATENT DOCUMENTS

| | | | |
|---|---|---|---|
| 5,251,148 A * | 10/1993 | Haines | F16K 31/122 700/282 |
| 6,539,267 B1 * | 3/2003 | Eryurek | G05B 13/0275 700/129 |
| 2003/0208305 A1 | 11/2003 | Junk et al. | |
| 2004/0039488 A1 | 2/2004 | Junk et al. | |
| 2004/0213319 A1 * | 10/2004 | Lancon | G01N 3/60 374/4 |

(Continued)

FOREIGN PATENT DOCUMENTS

| | | |
|---|---|---|
| DE | 102007016640 A1 | 10/2008 |
| EP | 1130484 A1 | 9/2001 |

(Continued)

OTHER PUBLICATIONS

International Search Report and Written Opinion of the International Searching Authority, issued in PCT/EP2019/054431, dated May 20, 2019; ISA/EP.

*Primary Examiner* — Bernard G Lindsay
(74) *Attorney, Agent, or Firm* — Harness, Dickey & Pierce, P.L.C.

(57) ABSTRACT

A diagnosis unit (1) for detection, analysis, and data management of sensor data detected on an actuator (20), has at least one sensor (14, 15), a data processing unit (10), a data manager (11), and an interface unit (12). The at least one sensor (14, 15), the interface unit (12), and the data manager (11) are respectively, connected to the data processing unit (10), enabling data exchange. The diagnosis unit (1) is built into a module with the actuator (20).

17 Claims, 1 Drawing Sheet

(56) References Cited

U.S. PATENT DOCUMENTS

| | | |
|---|---|---|
| 2008/0017245 A1 | 1/2008 | Kessler et al. |
| 2010/0138172 A1* | 6/2010 | Reinmuth ............. F16F 9/3292 |
| | | 702/50 |
| 2010/0176958 A1 | 7/2010 | Koch |
| 2017/0163515 A1* | 6/2017 | Heliker ................... G06F 1/263 |
| 2017/0285611 A1* | 10/2017 | Podpaly ............... G05B 19/416 |
| 2018/0187909 A1* | 7/2018 | Drees ....................... F24F 11/76 |
| 2019/0332462 A1* | 10/2019 | Kono ................. G06F 11/0793 |
| 2019/0368760 A1* | 12/2019 | Betschart ............ H04L 12/2807 |

FOREIGN PATENT DOCUMENTS

| | | |
|---|---|---|
| EP | 1502031 A1 | 2/2005 |
| WO | WO-2005085965 A1 | 9/2005 |

\* cited by examiner

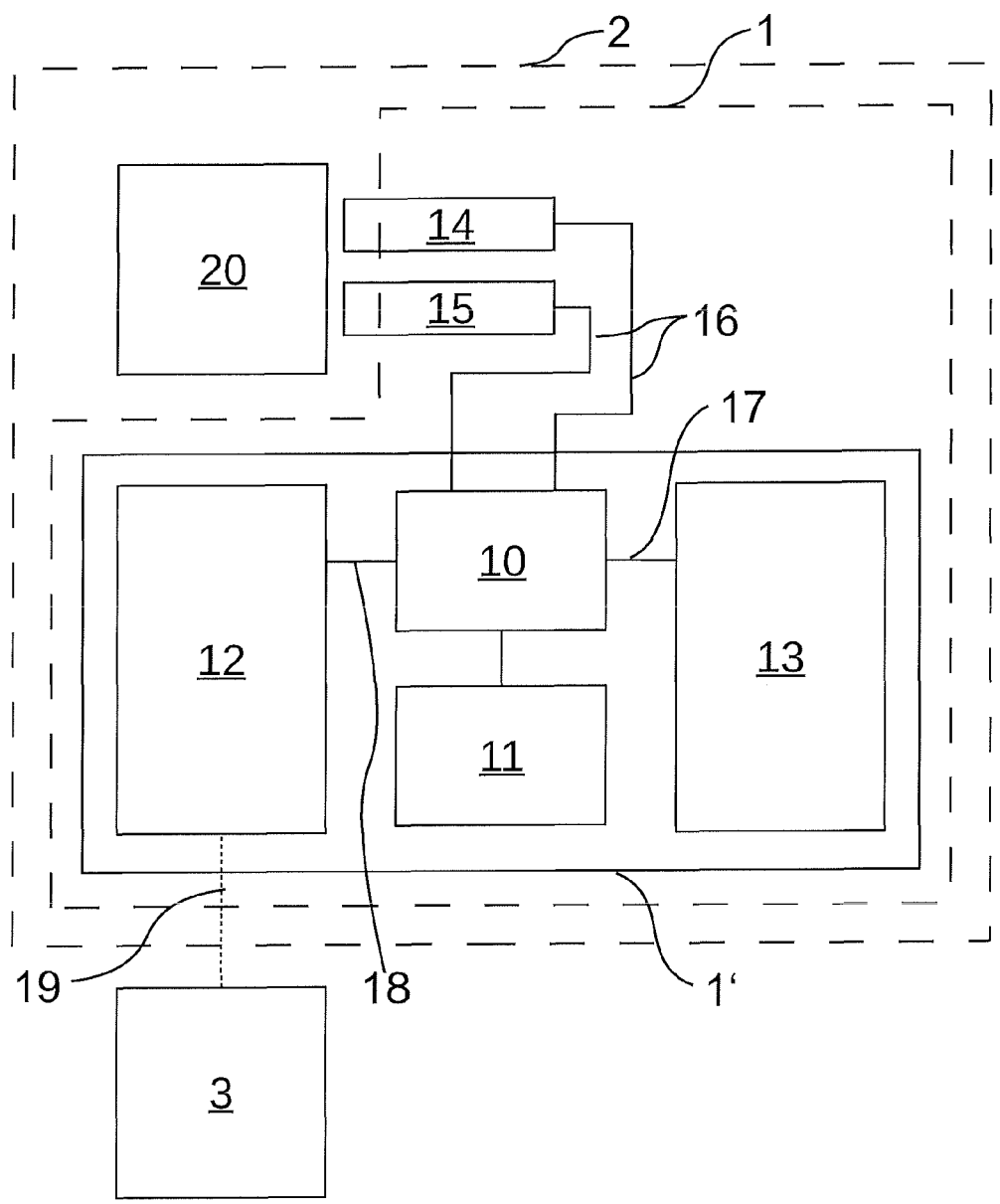

DIAGNOSIS UNIT, SYSTEM AND METHOD THAT UTILIZES ACTUATOR CYLINDER PRESSURE

CROSS-REFERENCE TO RELATED APPLICATIONS

This application is a National Stage of International Application No. PCT/EP2019/054431, filed Feb. 22, 2019 and published in German as WO2019206495 on Oct. 31, 2019. This application claims priority to German Patent Application No. 10 2018 110 084.1, filed Apr. 26, 2018. The entire disclosures of the above applications are incorporated herein by reference.

FIELD

The disclosure relates to a diagnosis unit for detection, analysis, and data management of sensor data detected on an actuator or on a machine element.

BACKGROUND

Various embodiments of diagnosis units for sensor data detected on actuators or on machine elements are already known from the prior art. For the most part, they are built directly into control units of the actuators to the extent that the diagnosis units rely on the hardware and software of the control units. In addition to this, the data processed by the diagnosis unit usually only reflects the physical variables determined via the sensor data over the course of time. This occurs without enabling the determination of a potential hazard state or instructions in order to prevent the hazard state. Furthermore, there is often no option for reading the sensor data or processed sensor data from the control. This is due to the fact that such controls are often protected and only accessible via special interfaces. Thus, the diagnosis units known in the prior art often only externally communicate an optical or acoustic warning signal.

In addition, the information is usually only transferred from the diagnosis unit in wired form. This means that time-consuming and costly rewiring must be implemented during retrofitting of a diagnosis unit.

Therefore, the object upon which the disclosure is based is to overcome the previously mentioned disadvantages. This disclosure provides a diagnosis unit for detection, analysis, and data management of sensor data detected on an actuator, with it being possible for the diagnosis unit to easily transmit the analyzed data.

This object is achieved byf a diagnosis unit for the detection, analysis, and data management of sensor data detected on an actuator comprising the diagnosis unit having at least one sensor, a data processing unit, a data manager, and an interface unit. The at least one sensor, the interface unit, and the data manager are respectively connected to the data processing unit. The data processing unit enables data exchange. The diagnosis unit is built into a module with the actuator.

SUMMARY

According to the disclosure, a diagnosis unit is proposed for detection, analysis, and data management of sensor data detected on an actuator or on a machine element. The diagnosis unit has at least one sensor, a data processing unit, a data manager, and an interface unit. The at least one sensor, the interface unit, and the data manager are respectively connected to the data processing unit. This enables data exchange. It is preferably connected to the data processing unit in a wired manner, respectively, via a connecting line or a bus line. Alternatively, the at least one sensor, the interface unit, and the data manager may also be connected to the data processing unit wirelessly instead of wired. The diagnosis unit is integrated into a module with the actuator. The module comprises the actuator and the diagnosis unit. The diagnosis unit detects, stores, and processes the sensor data and transmits the data via the interface unit and/or gateway as needed. The data processing unit is preferably formed to determine a procedure from the sensor data in order to prevent an undesirable state of the actuator. Preferably, the procedure is exclusively transmitted from the data processing unit via the interface unit.

A machine element may be, for example, a gas pressure spring. Here, a gas pressure is monitored, stored, and processed via the diagnosis unit. Alternatively, the machine element may also be other elements such as, for example, a screw or a metal housing, on which vibrations, for example, are detected by the sensor and processed by the diagnosis unit.

One advantageous refinement provides that the diagnosis unit further has a supply unit for supplying power. The supply unit is preferably a battery or a battery pack in order to enable autonomous power supply. Alternatively, the power supply to the diagnosis unit may also be implemented in wired form via the power supply of the actuator. Furthermore, the supply unit may be a generator that is driven by the actuator, in an alternative embodiment.

The interface unit and/or gateway preferably has a transmit and receive module. The interface unit is formed to wirelessly transmit data to a control of the actuator and/or to wirelessly receive data from the control. In addition to the diagnosis implemented by the diagnosis unit, the sensor data or the determined procedures can be transmitted to the control.

With one advantageous design variant, the diagnosis unit may be connected, via the interface unit, and preferably wirelessly to a display unit. In this case, the interface unit is designed to transmit data wirelessly to the display unit and/or to receive data wirelessly from the display unit. The display unit, for example, may be a smart phone or a tablet.

In a further embodiment of the diagnosis unit, the data processing unit is designed to receive sensor data from the at least one sensor, to store the data in the data manager, and to generate diagnostic data by a diagnostic method from the sensor data received and/or stored in the data manager. Furthermore, the data processing unit is designed to store the diagnostic data in the data manager and/or to transmit the data to the interface unit.

In order to process the detected sensor data and to enable a diagnosis based on the sensor data, the data processing unit is designed to carry out an interpolation, extrapolation, Fourier analysis, and/or vibration diagnosis on the sensor data.

In a further design variant, the interface unit is directly or promptly connected to the data manager in such a way to enable direct data exchange. Additionally or alternatively, the at least one sensor is directly or promptly connected to the data manager so as to enable direct data exchange.

One advantageous design of the diagnosis unit additionally provides that the diagnosis unit is built into a universal interface. The interface in this case, may be integrally designed in a plug connector or in a female plug connector or in a male plug connector. Alternatively, the diagnosis unit may also be integrated into a plug adapter. The plug adapter is plugged, for example as a connecting link, into a data or supply line between the actuator and its corresponding control.

In addition, the diagnosis unit may have an optical display unit. It displays that data from the interface unit is ready for transmission after an analysis of the sensor data is completed.

The data manager may be formed separable from the diagnosis unit to the extent that the stored data can be read out externally.

According to the disclosure, a system is proposed comprising a plurality of modules. Each of the modules has an actuator and a diagnosis unit according to the disclosure that detects sensor data on the actuator.

One advantageous refinement provides that the diagnosis units are connected to a central unit via their respective interface unit. The central unit collects, displays, or transmits the data.

According to the disclosure, a method for analyzing data detected on an actuator is proposed with a diagnosis unit according to the disclosure. The at least one sensor generates sensor data from physical variables measured on the actuator and transmits the data to the data manager and/or the data processing unit. The sensor data is stored in the data manager. The data processing unit determines a current and/or future actuator state from the transmitted and/or stored sensor data and stores the actuator state in the data manager. The data processing unit compares the actuator state with predetermined hazard states. When the actuator state corresponds to a hazard state, a hazard source that leads to the hazard state and is stored in the data manager is determined from the sensor data and/or stored characteristic maps.

It is advantageous with one refinement of the method that the data processing unit determines a procedure for resolving or preventing the hazard state, from the hazard source and the sensor data, by a plurality of predetermined procedures. Subsequently, at least the procedure, the actuator state, and the hazard state are transmitted to the control or the display unit via the interface unit. Alternatively, only the procedure can also be transmitted or initially the procedure and, upon request, further data such as the actuator state or hazard state can be transmitted. In this case, at least the procedure, the actuator state, and the hazard state can be read from the data manager and cached in the interface unit for subsequent transmission.

The previously disclosed features can be combined as desired to the extent that this is technically feasible and the features do not contradict one another.

DRAWINGS

The drawings described herein are for illustrative purposes only of selected embodiments and not all possible implementations, and are not intended to limit the scope of the present disclosure.

Other advantageous embodiments of the disclosure are in the dependent claims and/or are shown in more detail in the following by the FIGURE, along with the description of the preferred embodiment of the disclosure.

FIG. 1 is a schematic view.

DETAILED DESCRIPTION

FIG. 1 schematically shows the topological structure of a module 2 comprising an actuator 20 and a diagnosis unit 1. The diagnosis unit 1 has two sensors 14, 15. Each sensor determines a physical variable on the actuator 20. Furthermore, the diagnosis unit 1 has a data processing unit 10, a data manager 11, an interface unit 12, and a supply unit, implemented as a battery 13. They are arranged in a common housing 1'. The sensors 14, 15, the battery 13, the data manager 11, and the interface unit 12 are respectively connected to the data processing unit 10 via a wired line 16, 17, 18.

In the embodiment shown in FIG. 1, the actuator 20 is a hydraulic cylinder, where an interior pressure is established by a fluid. The sensor 14 detects an interior pressure generated in the cylinder by the fluid. It transmits information regarding the detected interior pressure to the data processing unit 10 in the form of sensor data, via the line 16. The data processing unit 10, compares, at intervals, the sensor data transmitted by the sensor 14. A maximum value is stored in the data manager 11 and determines whether the interior pressure exceeds the maximum value. In addition, the transmitted sensor data, along with the time of transfer and time of measurement are preferably stored on the data manager 11 at regular intervals to the extent that a history and/or a progression of the sensor data is stored on the data manager 11. The data processing unit 10 retrieves at least a portion of the stored sensor data at regular intervals. It determines when the interior pressure exceeds the predetermined maximum value by extrapolation of the sensor data.

The interior pressure in the cylinder corresponds to the actuator state. If the interior pressure is below the maximum value, this is considered to be a safe actuator state where no further action is necessary. If the interior pressure exceeds the maximum value or if it is determined, by the extrapolation of the data, that the maximum value has been exceeded within a predetermined time span, of 24 hours for example, this is considered a hazard state. Depending on further sensor data such as, for example, ambient temperature, cylinder temperature, position of the cylinder, and data stored in the data manager 11 regarding the actuator such as, for example, age, design type, or operating parameters, the data processing unit 10 selects an instruction and/or procedure, that correlates with the data available, from a group of potential instruction alternatives for remedying the hazard state, that is stored in the data manager 11.

Once a procedure has been selected, the data processing unit 10 stores the presence of a hazard state, together with all of the corresponding sensor data and the procedure. Thus, by means of a flag, it transmits the procedure, along with the respective sensor data, to a display unit 3 via the interface unit 12 and the wireless connection 19. If the transmission fails, the interface unit 12 attempts to transfer the procedure, along with the corresponding sensor data, to the display unit at regular intervals, as long as the flag is set.

If the hazard state has been eliminated, this is detected by the sensors 14, 15, and the set flag is deleted.

The disclosure is not limited in its design to the aforementioned preferred exemplary embodiments. Rather, a number of variants is conceivable, which would make use of the solution shown even with essentially different designs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A diagnosis unit for the detection, analysis, and data management of sensor data detected on an actuator comprising:
   the diagnosis unit having at least one sensor, a data processing unit, a data store, and an interface unit,
   wherein the at least one sensor includes a vibration sensor configured to measure vibration on a metal housing and a pressure sensor configured to measure a pressure within a cylinder of the actuator;
   the at least one sensor, the interface unit, and the data store being respectively connected to the data processing unit, enabling data exchange;
   the diagnosis unit and the actuator being built into a module, and
   the data processing unit being configured to, when the pressure exceeds a maximum value, select at least one of (a) an instruction for remedying a hazard state and (b) a procedure for remedying a hazard state, the selection being based at least one of (i) an ambient temperature, (ii) a cylinder temperature, (iii) a position of the cylinder, (iv) an age, and (v) a design type.

2. The diagnosis unit according to claim 1, further comprising a supply unit for power supply.

3. The diagnosis unit according to claim 2, wherein the supply unit is a battery or a battery pack.

4. The diagnosis unit according to claim 1, wherein the interface unit is designed to at least one of: (a) transmit data wirelessly to a control of the actuator; and (b) receive data wirelessly from the control.

5. The diagnosis unit according to claim 1, wherein the diagnosis unit is further connected to a display unit and the interface unit is designed to at least one of: (a) transmit data wirelessly to the display unit; and (b) receive data wirelessly from the display unit.

6. The diagnosis unit according to claim 1, wherein the data processing unit is configured to receive sensor data from the at least one sensor, to store the sensor data in the data store, and to generate diagnostic data from the sensor data at least one of received and stored in the data store by a diagnostic method, wherein
   the data processing unit is configured to store the diagnostic data in the data store and transmits the stored data to the interface unit.

7. The diagnosis unit according to claim 6, wherein the data processing unit is configured to carry out at least one of an interpolation, extrapolation, Fourier analysis, and vibration diagnosis on the sensor data.

8. The diagnosis unit according to claim 1, wherein the interface unit is directly connected to the data store enabling direct exchange of data.

9. The diagnosis unit according to claim 1, wherein the diagnosis unit is integrated into an interface.

10. The diagnosis unit according to claim 1, wherein the at least one sensor is directly connected to the data store enabling direct exchange of data.

11. The diagnosis unit according to claim 1, wherein the actuator is a gas pressure spring.

12. The diagnosis unit according to claim 1, wherein the diagnosis unit is integrally designed in one of a plug adapter and a plug connector.

13. The diagnosis unit according to claim 1, wherein the data processing unit is configured to determine whether the pressure exceeded the maximum value within a predetermined time span by extrapolation of sensor data.

14. A system comprising a plurality of modules, wherein each module has an actuator and a respective diagnosis unit that detects sensor data on the actuator, each diagnosis unit including at least one sensor, a data processing unit, a data store, and an interface unit,
   the at least one sensor including a vibration sensor configured to measure vibration on a metal housing and a pressure sensor configured to measure a pressure within a cylinder of the actuator;
   the at least one sensor, the interface unit, and the data store respectively connected to the data processing unit, enabling data exchange; and
   the data processing unit being configured to, when the pressure exceeds a maximum value, select at least one of (a) an instruction for remedying a hazard state and (b) a procedure for remedying a hazard state, the selection being based at least one of (i) an ambient temperature, (ii) a cylinder temperature, (iii) a position of the cylinder, (iv) an age, and (v) a design type.

15. A method for analyzing data detected on an actuator with a diagnosis unit, the actuator and the diagnosis unit being in a module, the method comprising:
   by a vibration sensor of the diagnosis unit, measuring vibration on a metal housing;
   by a pressure sensor of the diagnosis unit, measuring a pressure within a cylinder of the actuator, and
   wherein the diagnosis unit further includes an interface unit, a data processing unit, and a data store;
   exchanging data between the vibration sensor, the pressure sensor, the interface unit, the data store, and the data processing unit, the vibration sensor, the pressure sensor, the interface unit, and the data store respectively connected to the data processing unit enabling data exchange; and
   when the pressure exceeds a maximum value, by the data processing unit, selecting at least one of (a) an instruction for remedying a hazard state and (b) a procedure for remedying a hazard state, the selection being based at least one of (i) an ambient temperature, (ii) a cylinder temperature, (iii) a position of the cylinder, (iv) an age, and (v) a design type.

16. The method according to claim 15, the further comprising, transmitting, by data processing unit, procedure for eliminating or preventing the hazard state from the hazard source and the sensor data by a plurality of predetermined procedures, and at least the procedure, the actuator state, and the hazard state to a control or a display unit via the interface unit.

17. The method of claim 15 further comprising:
   storing the sensor data in the data store,
   determining, by the data processing unit, at least one of a current and future actuator state from at least one of the transmitted and stored sensor data, storing the actuator state in the data store, comparing the actuator state to predetermined hazard states, and when the actuator state corresponds to a hazard state, determining a hazard source from the at least one of the sensor data and stored characteristic maps and stored in the data store.

* * * * *

UNITED STATES PATENT AND TRADEMARK OFFICE
CERTIFICATE OF CORRECTION

| | | |
|---|---|---|
| PATENT NO. | : 11,366,464 B2 | |
| APPLICATION NO. | : 16/970365 | |
| DATED | : June 21, 2022 | |
| INVENTOR(S) | : Markus Knaup | |

It is certified that error appears in the above-identified patent and that said Letters Patent is hereby corrected as shown below:

In the Claims

Column 6, Line 45, Claim 16      before "further", delete "the"

Signed and Sealed this
Fourth Day of October, 2022

Katherine Kelly Vidal
*Director of the United States Patent and Trademark Office*